United States Patent
Anooshian et al.

(10) Patent No.: US 8,522,666 B2
(45) Date of Patent: Sep. 3, 2013

(54) REDUCED PROFILE AIR BRAKE ACTUATOR

(75) Inventors: Ben Anooshian, Fresno, CA (US);
Savvas Constantinides, Nicosia (CY);
Andreas Chimaris, Nicosia (CY)

(73) Assignee: TSE Brakes, Inc., Cullman, AL (US)

( * ) Notice: Subject to any disclaimer, the term of this patent is extended or adjusted under 35 U.S.C. 154(b) by 23 days.

(21) Appl. No.: 11/891,512

(22) Filed: Aug. 9, 2007

(65) Prior Publication Data

US 2008/0041672 A1   Feb. 21, 2008

Related U.S. Application Data

(60) Provisional application No. 60/838,577, filed on Aug. 17, 2006.

(51) Int. Cl.
*F16J 3/02*   (2006.01)

(52) U.S. Cl.
USPC ............................................. 92/98 R

(58) Field of Classification Search
USPC .......................................... 92/98 R
See application file for complete search history.

(56) References Cited

U.S. PATENT DOCUMENTS

| | | | | |
|---|---|---|---|---|
| 3,238,886 | A | * | 3/1966 | Johnson ..................... 92/98 R |
| 3,983,902 | A | * | 10/1976 | Lord ............................ 92/98 R |
| 5,031,875 | A | * | 7/1991 | Zimmerman ................ 92/98 R |
| 5,311,809 | A | * | 5/1994 | Choinski et al. ............. 92/98 R |
| 5,676,036 | A | | 10/1997 | Choinski |
| 5,765,466 | A | | 6/1998 | Plantan |
| 5,992,297 | A | | 11/1999 | Plantan et al. |
| 6,129,004 | A | | 10/2000 | Smith |
| 6,357,337 | B1 | | 3/2002 | Alvarez et al. |
| 6,526,866 | B2 | | 3/2003 | Pisoni et al. |
| 6,694,866 | B2 | * | 2/2004 | Smith et al. ................. 92/98 R |
| 6,988,442 | B2 | | 1/2006 | Fisher |
| 2007/0035177 | A1 | | 2/2007 | Thompson et al. |

FOREIGN PATENT DOCUMENTS

| DE | 102004018605 A1 | 11/2005 |
|---|---|---|
| GB | 1300162 | 12/1972 |

* cited by examiner

*Primary Examiner* — F. Daniel Lopez
(74) *Attorney, Agent, or Firm* — R. Blake Johnston, Esq.; DLA Piper LLP US

(57) ABSTRACT

A brake actuator can include a first housing part having a first peripheral wall, a second housing part having a second peripheral wall, and a flexible diaphragm located between the first housing part and the second housing part and compressed between a point of contact on the first housing part and a point of contact on the second housing part. At least one of the points of contact may protrude inwardly from the peripheral walls. The diaphragm may have a peripheral edge that does not extend radially beyond at least one of cylindrical profiles defined by the housing parts.

10 Claims, 6 Drawing Sheets

(Sharply Rounded)

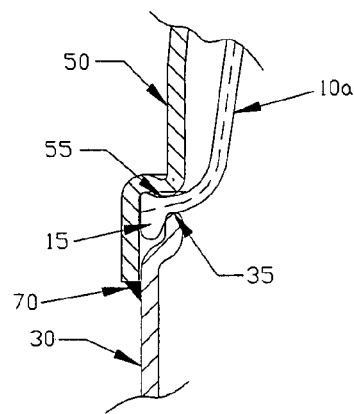
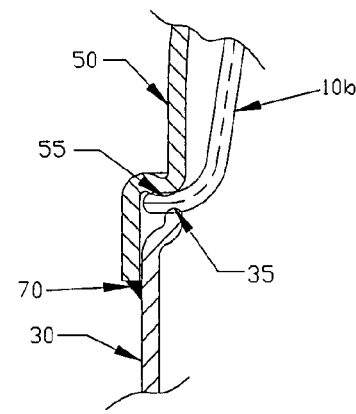
Fig. 1A
Fig. 1B
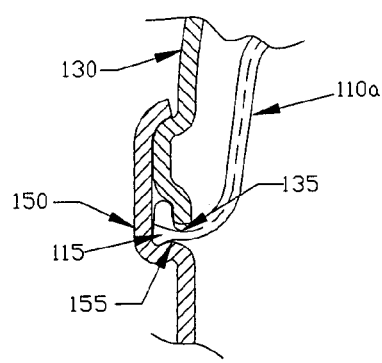
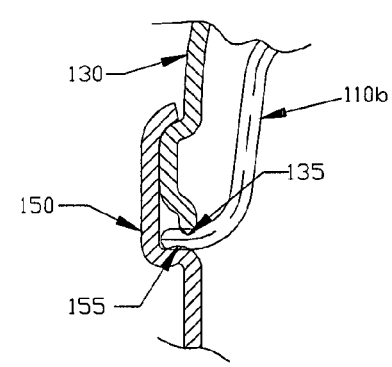
Fig. 2A
Fig. 2B

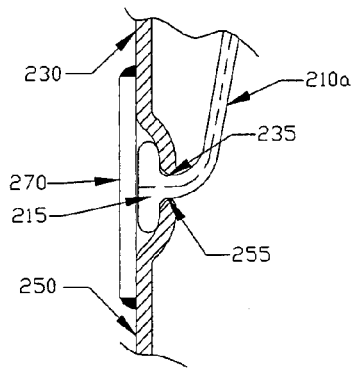 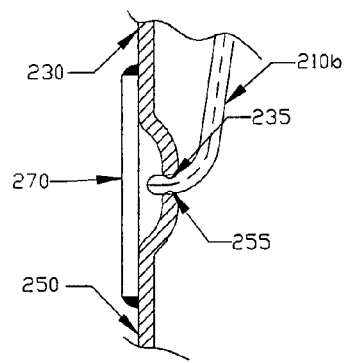
Fig. 3A  Fig. 3B
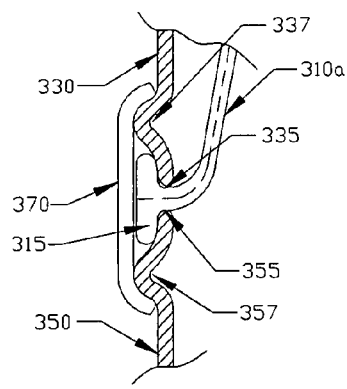 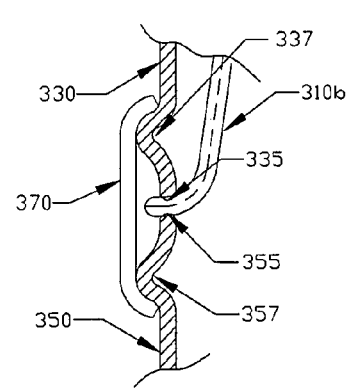
Fig. 4A  Fig. 4B
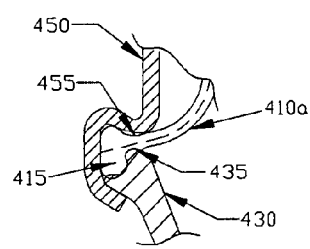 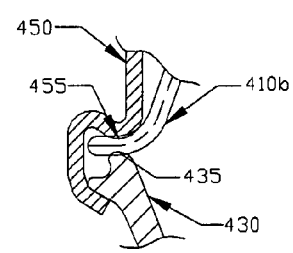
Fig. 5A  Fig. 5B (Knuckle)

(Blunted)

(Sharply Rounded)

REDUCED PROFILE AIR BRAKE ACTUATOR

CROSS-REFERENCE TO RELATED PATENT APPLICATIONS

The present application claims the benefit of U.S. Provisional Patent Application No. 60/838,577, filed Aug. 17, 2006, which is incorporated herein by reference in its entirety.

FIELD OF THE INVENTION

The present invention relates to single diaphragm or double diaphragm tandem chamber brake actuation chambers. More specifically, embodiments of the present invention pertain to apparatuses having diaphragm sealing mechanisms which result in reduced profile brake designs.

DISCUSSION OF THE BACKGROUND

Existing brake actuators are provided with service and/or spring brake chambers. Each chamber is typically formed from two housing parts, a base (or aluminum adapter) and a housing cup, which when fit together form the chamber. A flexible circular diaphragm is provided across the chamber, with the peripheral edge of the diaphragm compressed between portions of the base and housing cup to form an air tight seal. When the brake is at rest (i.e., the chamber is not pressurized) a spring located inside the chamber locates the diaphragm against a first end of the chamber. When pressure is introduced into the chamber by air or hydraulic fluid, the diaphragm expands and locates the spring towards a second end of the chamber.

In the spring brake chamber, pressure acts to hold off the emergency brake spring during normal operation of a vehicle. In an emergency situation, the pressure escapes the chamber and the emergency brake spring expands to apply braking force. Similarly, in the service brake chamber, the pressure constantly changes as the vehicle operator applies and releases the brake controls, causing the diaphragm and thus the spring to move back and forth.

In conventional brake systems, a narrow gap is provided between portions of the base and housing cup through which the diaphragm is placed. An enlarged, widened, bent, wedge-shaped, or otherwise outwardly deformed peripheral edge of the diaphragm is positioned on the outside of this gap (relative to the center of the chamber) to prevent the diaphragm from being pulled through (known as diaphragm pullout) during movement of the diaphragm (see, e.g., U.S. Pat. No. 5,992, 297). Conventional wisdom is that, absent an enlarged and/or outwardly deformed peripheral edge, the stresses placed on the diaphragm during operation would cause it to pull through the gap. In some conventional brake systems, an additional reinforcing member is attached to or provided at the enlarged peripheral edge of the diaphragm to further prevent it from being pulled through the gap (see, e.g., U.S. Pat. No. 6,988, 442).

The surface area of the diaphragm inside the chamber provides the functionality of the brake actuator and is directly related to the strength thereof. To maximize the force and/or limit the release pressure provided by the actuator, the functional surface area of the diaphragm must be maximized. However, in many cases, the space available for a brake actuator on a vehicle's axle is extremely limited. This is further constrained when considering that brake actuators having diaphragms with enlarged and/or outwardly deformed peripheral edges require additional external structures such as flanges, clamps or clips to cover the enlarged peripheral edges. Such additional structures typically result in brake actuators which have a profile significantly larger than that of the functional portion of the diaphragm.

It is therefore desirable to provide brake actuators wherein the functional surface area of the diaphragm is maximized while the overall profile of the chamber is maintained or reduced.

SUMMARY OF THE INVENTION

Embodiments of the present invention relate to brake actuators having unique diaphragm sealing structures. Specifically, embodiments of the present invention pertain to brake actuators which are flangeless or which have reduced and/or low profile inwardly projecting flanges in conjunction with a diaphragm having a consistent (or slightly enlarged and/or formed) cross-sectional thickness. This allows for a reduction in the overall diameter of the chamber without affecting the functional surface area of the diaphragm inside the chamber.

Testing by the inventors herein has shown that the compression of a peripheral edge of a diaphragm between two opposing points of contact, one on the base and the other on the housing cup, with sufficient force will (i) create an air tight seal, (ii) have improved resistance to diaphragm pullout, and (iii) allow for the reduction and/or elimination of an enlarged diaphragm portion without significantly reducing the life of the diaphragm. An overall reduction in the brake actuator's profile may be further reduced by moving the point of compression inline with or inside of the sidewall of the base or housing cup.

Brake actuators in accordance with the present invention may have a first housing part having a first peripheral wall, a second housing part having a second peripheral wall, and a flexible diaphragm located between the first housing part and the second housing part.

In one aspect of the invention, the first housing part may have a rounded first point of contact which may be an annular edge of the first peripheral wall and which may protrude inwardly from the first peripheral wall. The second housing part may have a second point of contact. The diaphragm may have a peripheral edge about axially compressed between the rounded first point of contact and the second point of contact.

In another aspect, the first housing part may have a rounded first point of contact which may be an annular edge of the first peripheral wall and which may protrude inwardly from the first peripheral wall. Similarly, the second housing may have a rounded second point of contact which may be an annular edge of the second peripheral wall and which may protrude inwardly from the second peripheral wall. The diaphragm may have a peripheral edge about axially compressed between the rounded first point of contact and the rounded second point of contact. The peripheral edge of the diaphragm may have a uniform thickness and may not extend radially beyond at least one of a first cylindrical profile defined by the first housing part and a second cylindrical profile defined by the second housing part.

In yet another aspect of the invention, the first housing part may have a first point of contact which may have a radius less than a maximum radius of an interior side of the first peripheral wall. Similarly, the second housing may have a second point of contact which may have a radius less than a maximum radius of an interior side of the second peripheral wall. The diaphragm may have a peripheral edge compressed between the first point of contact and the second point of contact.

In one aspect, the diaphragm may have a peripheral edge about axially compressed between a first rounded point of contact on the first peripheral wall and a second rounded point of contact on the second peripheral wall. The peripheral edge of the diaphragm may not extend radially beyond at least one of a first cylindrical profile defined by the first housing part and a second cylindrical profile defined by the second housing part.

Alternatively, and in another aspect, a brake actuator may have a first housing part having an annular edge, a second housing part having a complementary annular edge, and a flexible diaphragm extending across the brake actuator chamber. The diaphragm may have a peripheral edge sandwiched between the annular edges of the housing parts. At least one of the annular edges may include a rounded annular point of contact with the peripheral edge of the diaphragm that is devoid of a sharp edge so as not to cut the diaphragm.

Thus, the present invention advantageously provides reduced profile brake actuators by utilizing unique diaphragm sealing structures which do not require diaphragms having enlarged and/or outwardly deformed peripheral edges. Unlike conventional brake actuator designs which have such enlarged peripheral edges to resist diaphragm pullout, the present invention provides opposing points of contact on the base and housing cup to secure the diaphragm. This unique sealing mechanism allows for a reduction or elimination of the enlarged portion of the diaphragm and, consequently, allows for a reduction or elimination of the bulky additional flanges, clamps or clips that would otherwise be used to cover the enlarged portion of the diaphragm. Smaller structures may therefore be used to hold the base and housing cup together which results in a reduction of the overall diameter and profile of the brake actuator.

These and other objects, advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1A is a cross-sectional partial side view of an exemplary brake actuator including an inwardly projecting contact point in accordance with the present invention.

FIG. 1B is a cross-sectional partial side view of the exemplary brake actuator of FIG. 1A having an alternative diaphragm.

FIG. 2A is a cross-sectional partial side view of another exemplary brake actuator including an inwardly projecting contact point in accordance with the present invention.

FIG. 2B is a cross-sectional partial side view of the exemplary brake actuator of FIG. 2A having an alternative diaphragm.

FIG. 3A is a cross-sectional partial side view of an exemplary brake actuator including two inwardly projection contact points in accordance with the present invention.

FIG. 3B is a cross-sectional partial side view of the exemplary brake actuator of FIG. 3A having an alternative diaphragm.

FIG. 4A is a cross-sectional partial side view of another exemplary brake actuator including two inwardly projection contact points in accordance with the present invention.

FIG. 4B is a cross-sectional partial side view of the exemplary brake actuator of FIG. 4A having an alternative diaphragm.

FIG. 5A is a cross-sectional partial side view of an exemplary brake actuator with a rounded point on contact in accordance with the present invention.

FIG. 5B is a cross-sectional partial side view of the exemplary brake actuator of FIG. 5A having an alternative diaphragm.

DETAILED DESCRIPTION

Figure 6:
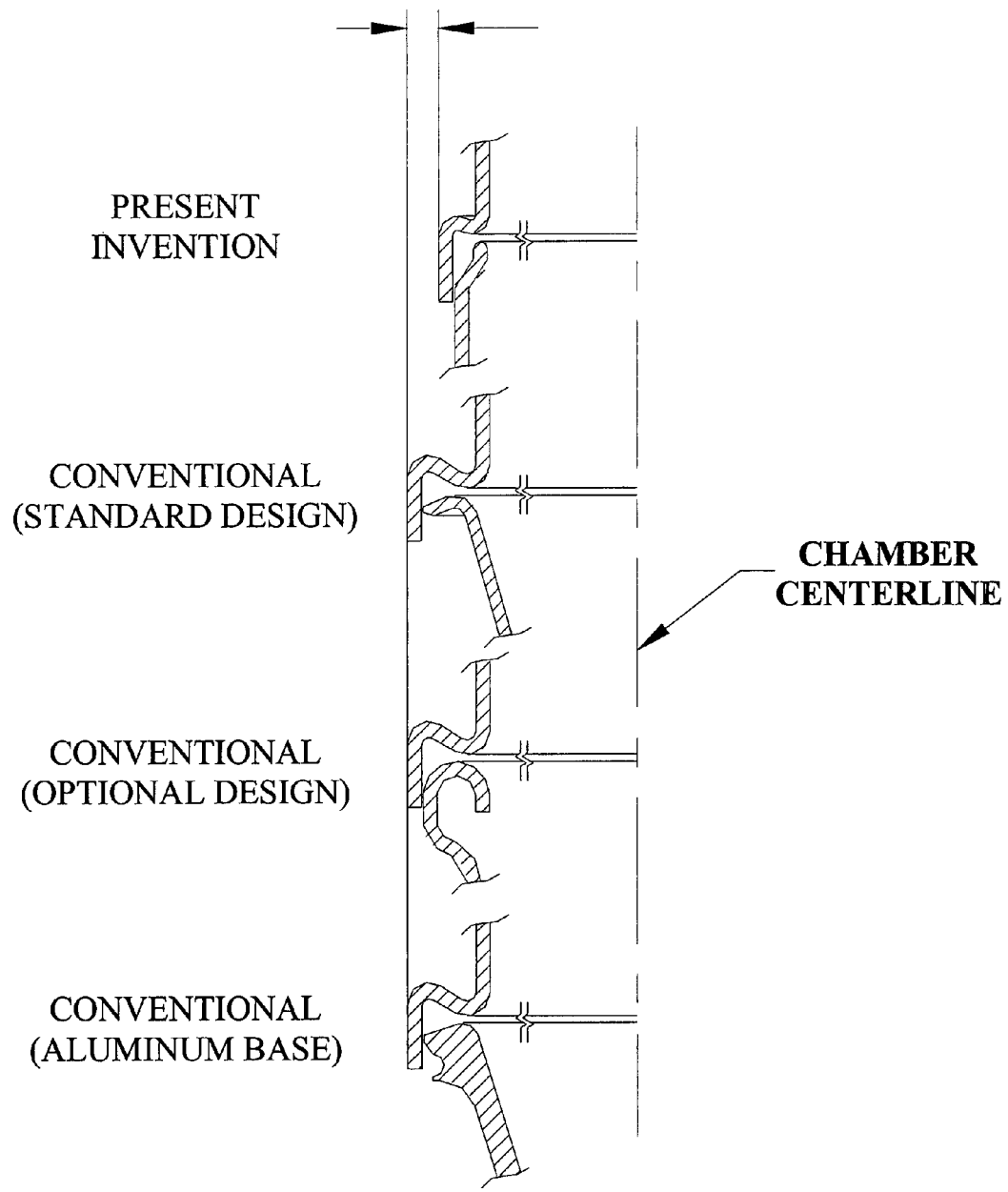
FIG. 6 is a diagram illustrating the profile of a brake actuator in accordance with the present invention, relative to conventional brake actuators.

The invention, in its various aspects, will be explained in greater detail below with regard to one or more preferred embodiments. While the invention will be described in conjunction with the preferred embodiments, the preferred embodiments themselves do not limit the scope of the invention. Rather the invention, as defined by the claims, may cover alternatives, modifications, and/or equivalents of the preferred embodiments. Similarly, the accompanying drawings do not limit the scope of the preferred embodiments and/or the invention, but rather, are illustrative of one or more examples of the preferred embodiments and/or invention.

As generally shown in the drawings, the present invention includes two somewhat cylindrical housing parts that are engaged together to form a chamber for a brake actuator. It is to be appreciated that the chamber may be either a spring brake or service brake chamber, that one of the housing parts is a base or adaptor, and that the other part is a housing cup. A flexible flat disc shaped diaphragm is provided between the two housing parts and thus across the chamber.

It should be appreciated that embodiments of the present invention utilize points of contact on each of the housing parts to compress the diaphragm and therefore seal the chamber. This is in contrast to conventional art which requires enlarged portions of the diaphragm on the outside of a gap formed by the two housing parts to prevent the diaphragm from pulling out.

Each of the two housing parts may have a peripheral wall and one or more directly opposing annular edges (e.g., protruding flanges), shoulders, knuckles, or similar devices that provide a point of contact to compress the diaphragm. In some embodiments, the point of contact of the first housing part may be rounded (or slightly blunted) so as not to cut into or through or otherwise damage the diaphragm. Similarly, in another embodiment, the point of contact of the second housing part may also be rounded (or slightly blunted). It is to be appreciated that different combinations of points of contact may be used, so long as the points of contact selected directly oppose each other when the two housing parts are engaged to each other. For example, the first housing part may have an annular edge and the second housing part may have a shoulder or knuckle (as shown in FIGS. 1A, 1B, 2A and 2B), the first and second housing parts may each have an annular edge (as shown in FIGS. 3A, 3B, 4A and 4B), or the first and second housing parts may each have a shoulder or knuckle (as shown in FIGS. 5A and 5B).

The peripheral edge of the diaphragm is compressed (or sandwiched) between a point of contact on the first housing part and a point of contact on the second housing part to form a seal. In several embodiments, and as generally shown in FIGS. 1A to 5A, the peripheral edge of the diaphragm may be slightly enlarged or may be formed in an "L", "T", or other shape such that it does not protrude significantly beyond the points of contact of the housing parts. In alternative embodiments, and as generally shown in FIGS. 1B to 5B, the annular edge of the diaphragm is not enlarged at all and has a consistent cross-sectional area. It can be appreciated that an "L", "T" or other shaped peripheral edge may be desirable as a guide or centering mechanism to ease the assembly process. It is to be understood that FIGS. 1A to 5A are similar in many aspects to that of FIGS. 1B to 5B, with the exception that FIGS. 1A to 5A exemplify a diaphragm having an enlarged peripheral edge while FIGS. 1B to 5B exemplify a diaphragm having a uniform cross sectional area. However, in all embodiments, the peripheral edge of the diaphragm is pinched between opposing points of contact on the housing parts.

Figure 7:
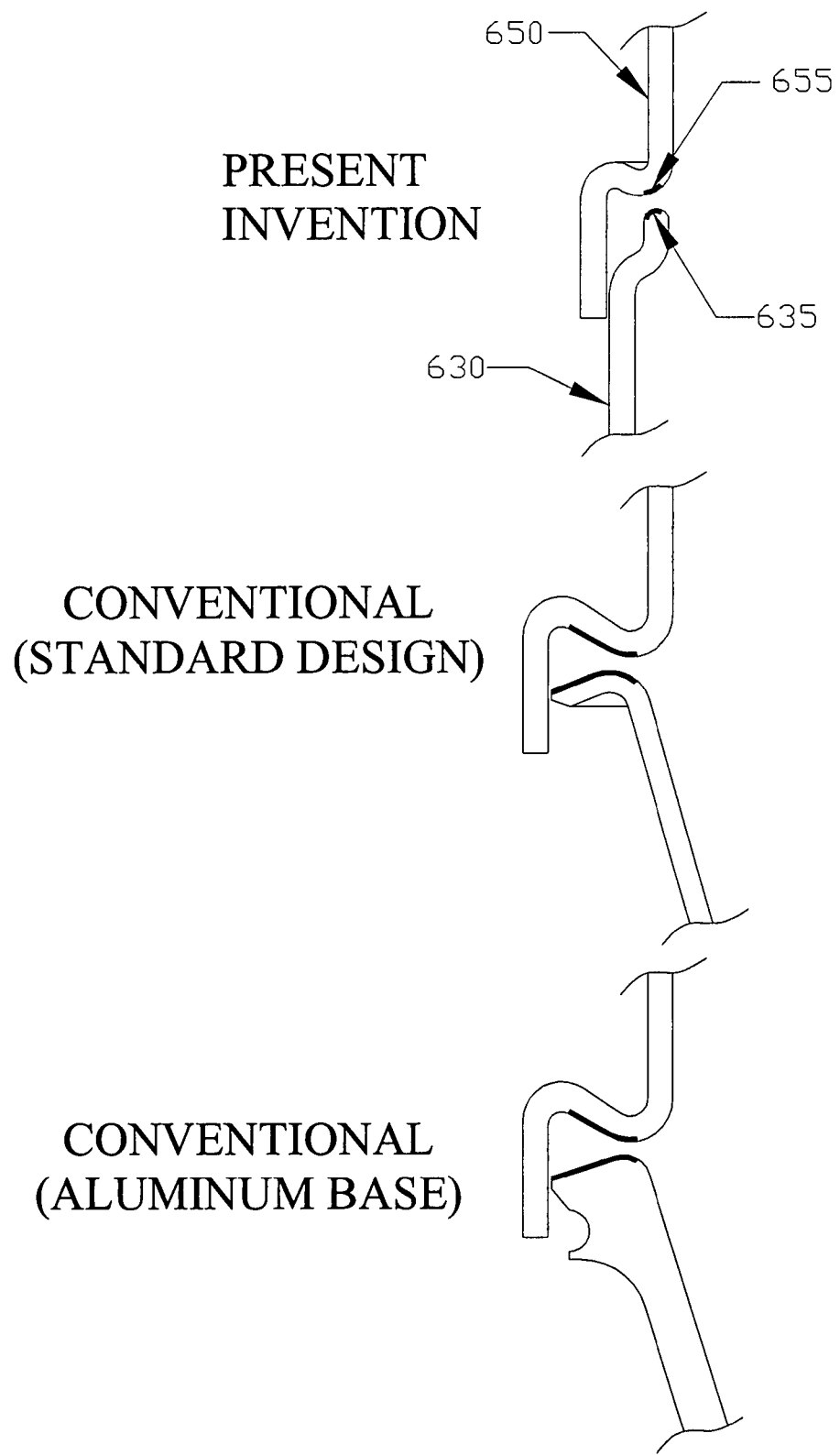
FIG. 7 is a diagram illustrating the location and size of the compression points of a brake actuator in accordance with the present invention, relative to conventional brake actuators.
Figure 8:
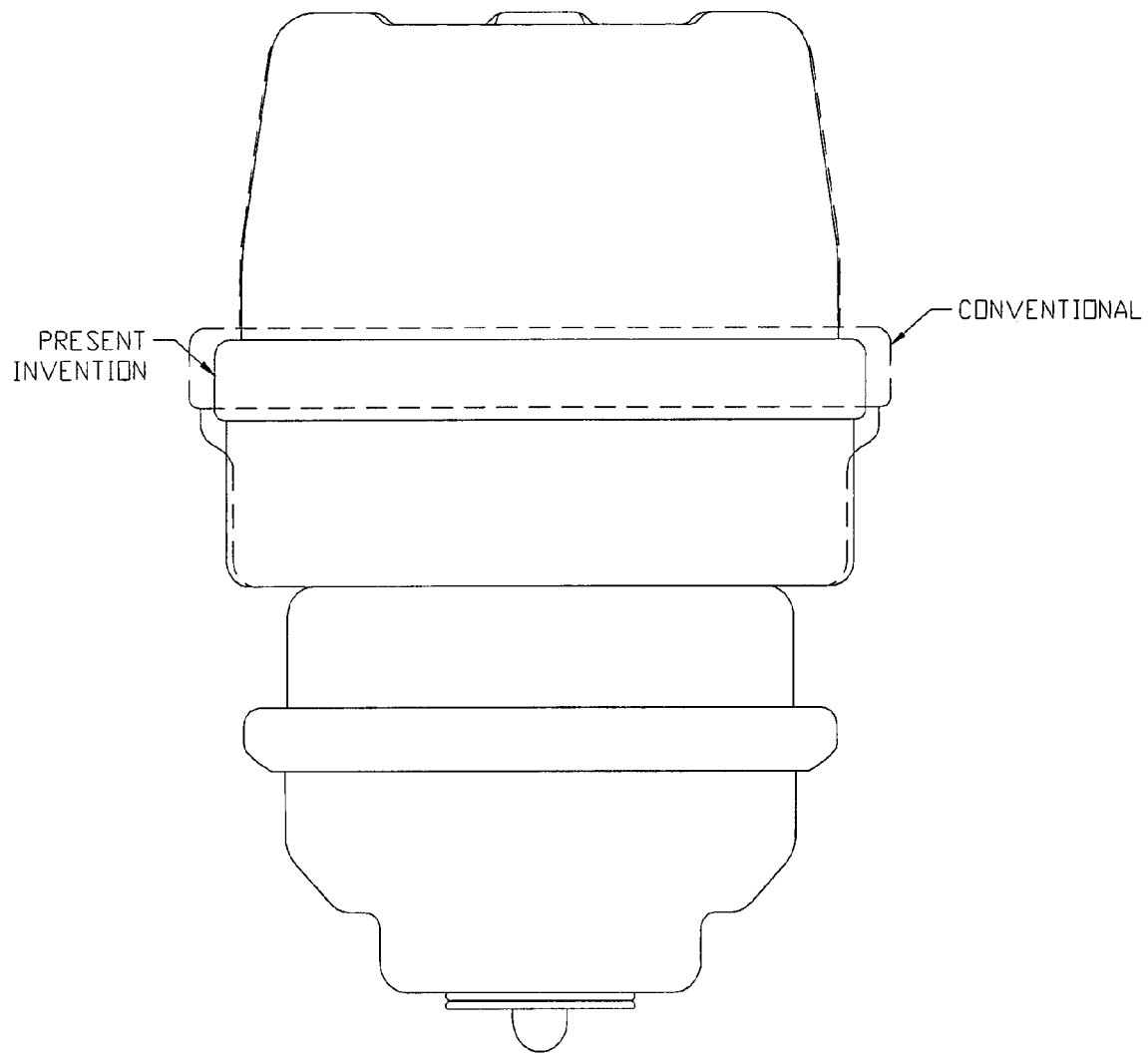
FIG. 8 is a diagram illustrating the size of a brake actuator in accordance with the present invention, relative to conventional brake actuators.
Figure 9A:
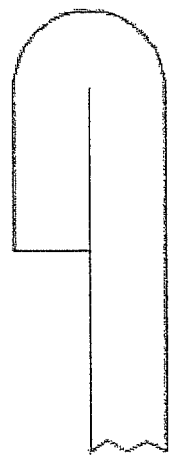
FIG. 9A is a detail view of an exemplary knuckle edge.
Figure 9B:
FIG. 9B is a detail view of an exemplary blunted edge.
Figure 9C:
FIG. 9C is a detail view of an exemplary sharply rounded edge.

As can be seen in the drawings, the peripheral walls of the housing parts are not required to protrude outwardly (in the radial direction) to hold the diaphragm in place since the diaphragm of the present invention is compressed between one or more points of contact generally inline or inside of the profile of the brake actuator. By compressing the diaphragm in such a way, smaller structures may be used to hold the housing parts together which therefore reduce the overall radius and profile of the brake actuator. As shown in FIG. 6, the present invention has a sufficiently smaller radius (measured from the chamber centerline to the outermost portion of the brake actuator at the intersection of the housing parts) than that of conventional designs. As shown in FIG. 7, the point of contact 635 on the first peripheral wall 630 and the point of contact 655 on the second peripheral wall 650 are smaller and are located closer to the chamber centerline than conventional designs. FIG. 8 is a diagram illustrating the profile of a brake actuator in accordance with the present invention which has a smaller profile than that of conventional designs (indicated by a dotted line).

A First Exemplary Brake Actuator

In one embodiment, a brake actuator can include: a first housing part having a first peripheral wall and a rounded first point of contact, wherein the first point of contact is an annular edge of the first peripheral wall and protrudes inwardly from the first peripheral wall; a second housing part having a second peripheral wall and a second point of contact; and a flexible diaphragm located between the first housing part and the second housing part and having a peripheral edge about axially compressed between the rounded first point of contact and the second point of contact.

Referring now generally to FIGS. 1A to 4A and 1B and 4B, and specifically to FIG. 1A, a first housing part may have a first peripheral wall 30 and a rounded first point of contact 35. The first point of contact 35 may be an annular edge 35 of the first peripheral wall 30 and may protrude inwardly from the first peripheral wall 30 (i.e., towards the center of the chamber). The brake actuator may also have a second peripheral wall 50 with a second point of contact 55. A flexible diaphragm 10a may be located between the first housing part and the second housing part and have a peripheral edge about axially compressed between the rounded first point of contact 35 and the second point of contact 55.

As above, the first point of contact 35 may be rounded. In one implementation, the second point of contact may also be rounded. Similarly, and in another implementation, the second point of contact may be slightly blunted so as to not cut the diaphragm. The diaphragm 10a may therefore be protected from damage when compressed between rounded and/or slightly blunted points of contact 35 and 55.

As above, the first point of contact 35 may be an annular edge 35 of the first peripheral wall 30. In one implementation, the second point of contact may be an annular shoulder of the second peripheral wall. In another implementation, the second point of contact may be a knuckle of the second peripheral wall. As shown in FIG. 1A, an annular shoulder (or knuckle) 55 may be formed in the second peripheral wall 50 to provide the second point of contact 55, however, the point of contact 155 may also be formed as shown in FIG. 2A. Alternatively, and according to another implementation, the second point of contact may be an annular edge of the second peripheral wall. As shown in FIG. 3A, the second point of contact 255 may be an annular edge 255 of the second peripheral wall 250, however, the point of contact 355 may also be formed as shown in FIG. 4A.

In another implementation, the second point of contact may protrude inwardly from the second peripheral wall. As shown in FIG. 3A, the second point of contact 255 may protrude inwardly (in the radial direction) towards the center of the chamber. Similarly, as shown in FIG. 4A, the peripheral wall 350 may protrude slightly outward and the second point of contact 355 may protrude inwardly therefrom.

In some implementations, a portion of the peripheral edge of the diaphragm may be minimally enlarged. As shown generally in FIGS. 1A to 4A, and referring specifically to FIG. 1A, the peripheral edge of the diaphragm 10a may have an enlarged portion 15. The enlarged portion may be in the form of an "L" shape as shown in FIGS. 1A and 2A, or the enlarged portion may be in the form of a "T" shape as shown in FIGS. 3A and 4A. It can be appreciated that a diaphragm having an "L", "T", or some similar shape on the peripheral edge may function as a guide or centering mechanism to ease the assembly process. However, in alternative implementations, the peripheral edge of the diaphragm may have a uniform thickness (i.e., not have an enlarged, cross-sectional area). As shown generally in FIGS. 1B-4B, and referring specifically to FIG. 1B, diaphragm 10b may be formed such that it has a uniform thickness (i.e., lacks an enlarged or shaped portion).

In some implementations, the peripheral edge of the diaphragm does not extend radially beyond at least one of a first cylindrical profile defined by the first housing part and a second cylindrical profile defined by the second housing part. As shown in FIGS. 1A and 3A, the peripheral edge of the diaphragms 10a and 210a, respectively, do not extend beyond the cylindrical profile defined by the peripheral walls 30 and 230, respectively, of the first housing part. Further, and as shown in FIG. 3A, diaphragm 210a does not extend radially beyond either the first peripheral wall 230 or the second peripheral wall 250.

A Second Exemplary Brake Actuator

In another embodiment, a brake actuator can include: a first housing part having a first peripheral wall and a rounded first point of contact, wherein the first point of contact is an annular edge of the first peripheral wall and protrudes inwardly from the first peripheral wall; a second housing part having a second peripheral wall and a rounded second point of contact, wherein the second point of contact is an annular edge of the second peripheral wall and protrudes inwardly from the second peripheral wall; and a flexible diaphragm located between the first housing part and the second housing part and having a peripheral edge about axially compressed between the rounded first point of contact and the rounded second point of contact, wherein the peripheral edge of the diaphragm has a uniform thickness and does not extend radially beyond at least one of a first cylindrical profile defined by the first housing part and a second cylindrical profile defined by the second housing part.

Referring now to the example of FIG. 3B, the first housing part may have a first peripheral wall 230 and the second housing part may have a second peripheral wall 250. The first 230 and second 250 peripheral walls may have rounded points of contact 235 and 255 which may be annular edges 235 and 255 of the first 230 and second 250 peripheral walls, respectively. The first 235 and second 255 points of contact may protrude inwardly (in the radial direction) from the first 230 and second 255 peripheral walls. A flexible diaphragm 210b between the first and second housing parts may have a peripheral edge that is compressed, axially, between the rounded first point of contact 235 and the rounded second point of contact 255. The peripheral edge of diaphragm 210b, as shown, has a uniform thickness and does not extend radially beyond at least one of a first cylindrical profile defined by the first housing part (e.g., peripheral wall 230) and a second cylindrical profile defined by the second housing part (e.g., peripheral wall 250).

A Third Exemplary Brake Actuator

In another embodiment, a brake actuator can include: a first housing part having a first peripheral wall and a first point of contact, wherein the first point of contact has a radius less than a maximum radius of an interior side of the first peripheral wall; a second housing part having a second peripheral wall and a second point of contact, wherein the second point of contact has a radius less than a maximum of an interior side of the second peripheral wall; and a flexible diaphragm located between the first housing part and the second housing part and having a peripheral edge compressed between the first point of contact and the second point of contact.

Referring now generally to the examples of FIGS. 3A, 3B, 4A, and 4B, and specifically to FIG. 4A, the brake actuator can have a first peripheral wall 330, a first point of contact 335, a second peripheral wall 350, and second point of contact 355. A flexible diaphragm 310a may be positioned between the first and second housing parts and have a peripheral edge compressed between the first point of contact 335 and the second point of contact 355. Both the first 335 and the second 355 points of contact may have a radius that is less than a maximum radius of an interior side of the first 330 and second 350 peripheral walls, respectively. For example, the first peripheral wall 330 may protrude slightly outward (at outward projection 337) and the first point of contact 335 may protrude inwardly thereof. The radius of point of contact 335, measured from the chamber centerline to the center of the point of contact 335, is less than the radius measured between the chamber centerline to the interior of peripheral wall 330 at outward protrusion 337. Similarly, the radius of point of contact 355 is less than the radius of the interior of peripheral wall 350 at outward protrusion 357.

In one implementation, the peripheral edge of the diaphragm is about axially compressed between the first point of contact and the second point of contact. As shown, the first 335 and second 355 points of contact compresses the peripheral edge of the diaphragm in the axial direction to seal the chamber. However, depending on the specific construction of the brake actuator, the diaphragm may not be compressed exactly in the axial direction, but rather, may be compressed at a different angle.

In one implementation, the first point of contact can be a rounded point of contact. In a further implementation, the second point of contact can be a rounded point of contact. In another implementation, the first and the second point of contact may be slightly blunted so as not to cut the diaphragm. For example, the first contact point 335 and/or the second contact point 355 may be rounded or slightly blunted to prevent damage to the diaphragm 310a when it is compressed between the two contact points.

In some implementations, a portion of the peripheral edge of the diaphragm may be minimally enlarged. For example, the peripheral edge of the diaphragm 310a may have an enlarged portion 315. The enlarged portion may be in the form of a "T" shape as shown, however, it can be appreciated that a diaphragm having some similar shape on the peripheral edge may also function as a guide or centering mechanism to ease the assembly process. In alternative implementations, the peripheral edge of the diaphragm may have a uniform thickness (i.e., not have an enlarged, cross-sectional area). As shown generally in FIG. 4B, diaphragm 310b may be formed such that it has a uniform thickness (i.e., lacks an enlarged or shaped portion).

In one implementation, the peripheral edge of the diaphragm may not extend radially beyond a first cylindrical profile defined by the first housing part and a second cylindrical profile defined by the second housing part. For example, and referring to FIG. 3A, the non-projected portion of the first peripheral wall 230 may define a first cylindrical profile and the non-projected portion of the second peripheral wall 250 may define a second peripheral profile. The peripheral edge of diaphragm 210a (which may include an enlarged part 215) does not extend radially beyond either the first or the second cylindrical profile.

A Fourth Exemplary Brake Actuator

In another embodiment, a brake actuator can include: a first housing part having a first peripheral wall; a second housing part having a second peripheral wall; and a flexible diaphragm located between the first housing part and the second housing part and having a peripheral edge about axially compressed between a first rounded point of contact on the first peripheral wall and a second rounded point of contact on the second peripheral wall, wherein the peripheral edge of the diaphragm does not extend radially beyond at least one of a first cylindrical profile defined by the first housing part and a second cylindrical profile defined by the second housing part.

Referring now generally to the examples of FIGS. 1A, 1B, 3A, and 3B, and specifically to FIG. 1A, the brake actuator may include a first housing part having a first peripheral wall 30 and a second housing part having a second peripheral wall 50. A flexible diaphragm 10a may be positioned between the first and second housing parts and may have a peripheral edge compressed between a first rounded point of contact 35 on the first peripheral wall 30 and a second rounded point of contact 55 on the second peripheral wall 50. The peripheral edge of the diaphragm 10a does not extend radially beyond at least one of a first cylindrical profile defined by the first housing part (e.g., the first peripheral wall 30) and a second cylindrical profile defined by the second housing part (e.g., the second peripheral wall 50).

A Fifth Exemplary Brake Actuator

In another embodiment, a brake actuator chamber can include: a first housing part having an annular edge; a second housing part having a complementary annular edge; and a flexible diaphragm extending across the chamber, wherein the diaphragm has a peripheral edge sandwiched between the annular edges of the housing parts and at least one of the annular edges includes a rounded annular point of contact with the peripheral edge of the diaphragm that is devoid of a sharp edge so as not to cut the diaphragm.

As shown generally in the diagrams, and referring specifically to the example of FIG. 5A, a first housing part (e.g., an aluminum adapter 430) can have an annular edge 435. A second housing part (e.g., a housing cup 450) can have a complementary annular edge 455. A flexible diaphragm 410a extends across the chamber and has a peripheral edge that is sandwiched (or compressed) between the annular edges 435 and 455 of the housing parts. As shown, the first housing part (e.g., the aluminum adaptor 430) may have a rounded annular point of contact 435 with the peripheral edge of the diaphragm 410a.

Similarly, and by way of another example as shown in FIG. 1A, a first housing part (e.g., a first peripheral wall 30) can have an annular edge 35 (or flange) and a rounded annular point of contact 35 with the peripheral edge of diaphragm 10a that is devoid of a sharp edge so as not to cut the diaphragm. A second housing part (e.g., a second peripheral wall 50) can have a complementary annular edge 55. The diaphragm 10a has a peripheral edge that is pinched (or sandwiched) between annular edges 35 and 55 of the housing parts.

In one implementation, the housing parts may be secured together by a small weld 70 (as shown in FIG. 1A) or by a welded band 270 (as shown in FIG. 3A). In an alternative implementation, the second housing part may be rolled, crimped, or clamped over the first housing part (as shown in FIGS. 2A and 5A). In yet another alternative implementation, a band 370 may be rolled, crimped, clamped, and or welded over slight outward protrusions 337 and 357 of the first and second housing parts, respectively (as shown in FIG. 4A).

In another implementation, and referring back to the example of FIG. 5A, the annular point of contact 435 can include an annular shoulder (or knuckle) 435. In another embodiment, the annular point of contact 435 may be slightly blunted so as not to cut the diaphragm 410a. In some embodiments, both annular edges 435 and 455 may be rounded.

In other implemenations, the outside peripheral edge of the diaphragm does not extend radially beyond the cylindrical profile defined by the housing parts. For example, as shown generally in FIGS. 1A, 1B, 3A and 3B, and specifically referring to FIG. 1A, the peripheral edge of the diaphragm 10a does not extend radially beyond at least one of a first cylindrical profile defined by the first housing part (e.g., the first peripheral wall 30) and a second cylindrical profile defined by the second housing part (e.g., the second peripheral wall 50).

In some implementations, the peripheral edge of the diaphragm is not enlarged. As shown in FIGS. 1B to 5B, and specifically referring to FIG. 5B, diaphragm 410b may be formed such that it has a uniform thickness (i.e., lacks an enlarged or shaped portion).

It is to be appreciated that the present invention may be employed on either or both of the spring (emergency) brake or service brake housing chambers. Further, it is to be understood that variations and/or modifications of the present invention may be made without departing from the scope of thereof. It is also to be understood that the present invention is not to be limited by the specific embodiments, descriptions, or illustrations or combinations of either components or steps disclosed herein.

What is claimed is:

1. A brake actuator comprising:
   a first housing part having a centerline, a first generally cylindrical chamber sidewall, a portion of which defines a first cylindrical profile having an inner surface contacted by a working fluid inside said housing part, and a first circular contact surface, wherein said first generally cylindrical chamber sidewall terminates in an annular edge and the first contact surface is devoid of a sharp edge and is located on an entirety of the annular edge of said first sidewall:
   b) a second housing part having a centerline in axial alignment with the centerline of said first housing part, a second generally cylindrical chamber sidewall, a portion of which defines a second cylindrical profile having an inner surface contacted by a working fluid inside said housing part, and an annular knuckle provided on said second generally cylindrical sidewall with a second circular contact surface that is devoid of a sharp edge on said knuckle, said second contact surface being in alignment with said first contact surface and extending around said centerline; and
   c) a flexible diaphragm having a peripheral edge, said diaphragm being axially compressed near said peripheral edge between the first contact surface and the second contact surface:
   wherein said first and second housing parts form a chamber that encloses a spring assembly, wherein the direction of said axial compression is substantially parallel to said centerline, and wherein the peripheral edge of said diaphragm does not extend radially beyond at least one of said first cylindrical profile and said second cylindrical profile.

2. The brake actuator of claim 1, wherein the second contact surface is rounded.

3. The brake actuator of claim 1, wherein the second contact surface is slightly blunted so as not to cut the diaphragm.

4. The brake actuator of claim 1, wherein the peripheral edge of the diaphragm has a uniform thickness.

5. The brake actuator of claim 1, wherein a portion of the peripheral edge of the diaphragm is minimally enlarged.

6. A brake actuator chamber comprising:
   a) a first housing part terminating in an annular edge that is sharply rounded;
   b) a second housing part having a complementary annular edge that is sharply rounded;
   c) a central axis through said first and second housing parts; and
   d) a flexible diaphragm extending across said chamber, wherein said chamber encloses a spring assembly, wherein said diaphragm has a peripheral edge axially sandwiched between the entirety of the annular edges of said housing parts, wherein the direction of said axial compression is substantial parallel to said central axis, wherein a working fluid is provided inside said actuator on either side of said diaphragm, and an outside peripheral edge of said diaphragm does not extend radially beyond at least one of a first cylindrical profile defined by a portion of the first housing part having an inner surface contacted by the working fluid in the first housing part and a second cylindrical profile define by a portion of the second housing part having an inner surface contacted by the working fluid in the second housing part.

7. The brake actuator chamber of claim 6, wherein the peripheral edge of said diaphragm has a uniform thickness.

8. A brake actuator comprising:
   a) first housing part comprising a first generally cylindrical wall terminating in an annular edge and having a centerline, an inwardly protruding annular flange and a first contact surface located on an entirety of the annular edge of said first generally cylindrical wall, where the annular edge of said first generally cylindrical wall is sharply rounded;
   b) a second housing part comprising a second generally cylindrical wall having a centerline in axial alignment with the centerline of said first housing part, an annular shoulder thereon and a second contact surface located on said annular shoulder, said second contact surface being in alignment with said first contact surface; and c) a flexible diaphragm having a peripheral edge, said diaphragm being axially compressed near said peripheral edge between the first contact surface and the second contact surface, wherein said first and second housing parts form a chamber that encloses a spring assembly, wherein the direction of said axial compression is substantially parallel to said centerline, wherein a working fluid is provided inside said actuator on either side of said diaphragm, and wherein the peripheral edge of said diaphragm does not extend radially beyond the wider of a first cylindrical profile defined by a portion of the first generally cylindrical wall having an inner surface contacted by the working fluid in the first housing part and a second cylindrical profile defined by a portion of the second generally cylindrical wall having an inner surface contacted by the working fluid in the second housing part.

9. The brake actuator of claim 8 wherein the peripheral edge of said diaphragm has an L-shaped cross section.

10. The brake actuator of claim 8 wherein said annular shoulder is in axial alignment with the edge of said inwardly protruding flange.

* * * * *